(12) United States Patent
Krause et al.

(10) Patent No.: US 7,906,929 B2
(45) Date of Patent: Mar. 15, 2011

(54) METHOD AND DEVICE FOR CONTROLLING A THREE-PHASE MACHINE HAVING SEVERAL PHASE WINDINGS, WHICH CAN BE CONTROLLED BY MEANS OF PULSE WIDTH MODULATION

(75) Inventors: Uwe Krause, Pattensen (DE); Uwe Nolte, Barsinghausen (DE); Jan Spannberger, Hannover (DE)

(73) Assignee: Siemens Aktiengesellschaft, Munich (DE)

( * ) Notice: Subject to any disclaimer, the term of this patent is extended or adjusted under 35 U.S.C. 154(b) by 386 days.

(21) Appl. No.: 12/011,224

(22) Filed: Jan. 24, 2008

(65) Prior Publication Data
US 2008/0191660 A1 Aug. 14, 2008

(30) Foreign Application Priority Data
Jan. 26, 2007 (DE) .......................... 10 2007 004 094

(51) Int. Cl.
*G05B 11/28* (2006.01)
(52) U.S. Cl. ......... 318/599; 318/811; 388/800; 388/804; 388/811
(58) Field of Classification Search .................. 318/599, 318/811, 432, 721; 388/800, 804, 806, 811, 388/815, 819
See application file for complete search history.

(56) References Cited

U.S. PATENT DOCUMENTS

| 4,074,179 | A | * | 2/1978 | Kuo et al. | 318/696 |
|---|---|---|---|---|---|
| 5,281,903 | A | * | 1/1994 | Oku et al. | 318/701 |
| 5,309,349 | A | | 5/1994 | Kwan | |
| 5,818,178 | A | * | 10/1998 | Marumoto et al. | 318/400.32 |
| 6,016,042 | A | * | 1/2000 | Miura et al. | 318/430 |
| 6,137,251 | A | * | 10/2000 | Huang et al. | 318/400.12 |
| 6,335,600 | B1 | * | 1/2002 | Kasai et al. | 318/434 |
| 6,940,235 | B2 | * | 9/2005 | Getz et al. | 318/400.15 |
| 7,141,943 | B2 | * | 11/2006 | Song et al. | 318/400.34 |
| 7,417,390 | B2 | * | 8/2008 | Getz et al. | 318/400.01 |
| 2002/0167300 | A1 | | 11/2002 | Klm | |
| 2004/0095090 | A1 | | 5/2004 | Nukushina | |
| 2005/0269982 | A1 | * | 12/2005 | Coles et al. | 318/254 |
| 2006/0043915 | A1 | * | 3/2006 | Kim | 318/254 |
| 2008/0273360 | A1 | * | 11/2008 | Goto | 363/131 |

FOREIGN PATENT DOCUMENTS
DE 102 51 158 A1 5/2004
DE 10 2004 057 869 A1 6/2006
* cited by examiner

*Primary Examiner* — Rina I Duda

(57) ABSTRACT

An aspect of the invention is a method and a device for controlling a rotating field machine having several phase windings, which can be controlled by means of pulse width modulation, wherein a pulse width modulation controller is adapted in such a way that an individual winding of the phase windings of the rotating field machine is energized at a specifiable sampling time.

14 Claims, 2 Drawing Sheets

METHOD AND DEVICE FOR CONTROLLING A THREE-PHASE MACHINE HAVING SEVERAL PHASE WINDINGS, WHICH CAN BE CONTROLLED BY MEANS OF PULSE WIDTH MODULATION

CROSS REFERENCE TO RELATED APPLICATIONS

This application claims the benefits of German application No. 10 2007 004 094.8 filed Jan. 26, 2007, and is incorporated by reference herein in its entirety.

FIELD OF INVENTION

The invention relates to a method and a device for controlling a rotating field machine, in particular an electric motor, for example an electronically commutated alternating current motor having several phase windings, which can be controlled by pulse width modulation.

BACKGROUND OF THE INVENTION

For the control of electric motors with several phase windings to which an electric current is supplied alternately and/or with a time overlap, it is necessary that, for example, the currents flowing through the individual phase windings are measured as at least one operating variable. Different measuring devices are known from the prior art, which have a number of current measuring devices $S_1$ to $S_3$ corresponding to the number of phase windings $n_1$ to $n_3$ for measuring associated individual currents $i_1$ to $i_3$, as is shown schematically in FIG. 1 for the prior art. For reasons of symmetry, a number of current measuring devices (=n−1) is used, which is one less than the number of phase windings, wherein the missing partial current can easily be determined based on the other measured partial currents. Because of the required number of individual current measuring devices and the high costs of the individual current measuring devices, a device of this kind for measuring current is very elaborate and expensive.

Furthermore, it is disclosed in DE 102 51 158 A1 to measure the total current of all individual currents by means of a single current measuring device and subsequently to calculate the electrical currents in the individual phase windings by means of an electronic unit based on a model for the drive unit. Estimates of this kind based on models can lead to errors in calculating the individual currents. These errors are particularly large at certain frequencies and loads of the electric motor.

SUMMARY OF INVENTION

The invention is therefore based on the object of specifying a method and a device for controlling a rotating field machine, which can be controlled by means of pulse width modulation, in which operating variables, in particular individual currents of the phase windings, can be determined accurately, reliably and easily.

With regard to the method, according to the invention, the object is achieved by the characteristics of the claims, and with regard to the device, by the characteristics of the claims.

Advantageous developments of the invention are subject matter of the dependent claims.

In the method according to the invention for controlling a rotating field machine, which can be controlled by means of pulse width modulation, in particular a synchronous machine, an electric motor, e.g. a DC or AC motor, a pulse width modulation controller is adapted in such a way that a specified phase winding is energized and supplied at a specifiable sampling time. The sampling time is understood to mean in particular a time, which is synchronized about a mid-point sampling within a specified switching period. The specified energization of an individual phase winding of the rotating field machine enables individual operating variables of the rotating field machine to be measured and determined directly and without elaborate models in a simple manner. At the same time, by specific adaptation of the pulse width modulation controller, required states of the rotating field machine are set and their relevant operating variables, for example the current and/or voltage, are measured.

Expediently, at the specified sampling time, the phase of the specified phase winding is controlled to a specified first electrical potential and the phases of the other phase windings are controlled to a second electrical potential. For example, the phase of the specified phase winding for which an individual current for example is to be measured as an operating variable, is set to a so-called high potential, and the phases of the other phase windings to a so-called low potential or vice versa.

Expediently, with the adapted pulse width modulation controller, the position, i.e. the switching times, of the switch-on period and the switch-off period of the respectively energized phase winding is changed, in particular while the ratio of switch-on period to switch-off period remains constant. For example, the switching times of the switch-on period and the switch-off period of the individual phase windings are set so that only one phase winding is supplied and therefore a current only flows through one phase winding at the specified sampling time. In order not to affect the drive to the rotating field machine by a change of this kind in the position of switch-on period and switch-off period of the individual phase windings, the pulse width modulated signals for energizing the phase windings resulting from the adapted pulse width modulation controller preferably have a constant switch-on period in total and therefore a constant so-called voltage/time area. For this purpose, for example, at least one pulse width modulated signal is negated and the associated pulse width modulated value is inverted. Furthermore, the basic pulse width modulation cycle is accordingly cared out unchanged by means of the adapted pulse width modulation controller in that the position of the switching times of the switch-on period and the switch-off period for each phase winding is displaced while the ratio of switch-on period to switch-off period remains constant. By this means, correction blocks or compensation cycles can be avoided.

Alternatively, with an adapted symmetrical pulse width modulation controller, it is possible to control a pulse width modulated counter with the opposite count direction while at the same time negating the output.

Preferably, at least one operating variable, in particular the current and/or the voltage, can be determined for the phase winding energized by the adapted pulse width modulation controller.

In a possible embodiment, a total current of all phase windings is determined, preferably by means of a single current measuring device, and, by means of this current measuring device, an individual current of the energized phase winding is determined by the adapted pulse width modulation controller at the specified sampling time.

By the arrangement of a single current measuring device in a part of the circuit in which the summated or total current of all feed cables to all phase windings can be measured, and by a specified modification of the pulse width modulation controller, it is ensured that the total current of all phase windings and also the individual currents in the individual phase windings can be determined with only one current measuring device. In doing so, the individual currents are measured directly and therefore without calculation models or estimations. Using one and the same current measuring device for measuring total current and individual currents results in a particularly cost-effective device. Furthermore, errors due to asymmetry in the construction of the device or due to calculation models or estimates are reliably avoided by measuring the current directly.

Depending on the set potential, at the sampling time, the current of the specified phase winding flows through the current measuring device in a positive or negative direction, wherein the currents of the other phase windings flow through the current measuring device in the opposite direction. In detail, for example in the case of an electric motor or drive with three phase windings, the phase current of the individual phase winding is given by:

$$i_n = -i_{n+1} - i_{n+2} \text{ or } -i_n = i_{n+3} + i_{n+2} \qquad \text{a.}$$

In a further development of the invention, in particular for drive systems without transducers, the phase position of the current and/or the rotor can furthermore be determined based on all the measured individual currents of all phase windings by means of vector addition.

Alternatively, the voltage of the energized phase winding for example can be determined as the operating variable.

With regard to the device according to the invention for controlling a motor having several phase windings, which can be controlled by means of pulse width modulation, this comprises a pulse width modulation controller by means of which an individual phase winding can be energized at a specifiable sampling time.

By modified, in particular specific energization of the phase windings of the rotating field machine by means of an adapted pulse width modulation controller, one of the phase windings is then preferably supplied so that, for the purpose of measuring an operating variable for example, a current measuring device can determine the individual current of the phase winding concerned or another suitable sensor device can determine another operating variable, for example the voltage. In doing so, by means of the pulse width modulation controller, expediently only the specified phase winding is energized at the specified sampling time.

In a further embodiment, a single current measuring device for determining a total current of all phase windings and the adapted pulse width modulation controller are provided for the purpose of measuring the current in phase windings of the rotating field machine, wherein a specified individual phase winding can be energized by means of the adapted pulse width modulation controller in such a way that the current measuring device determines an individual current of the specified phase winding. For this purpose, the current measuring device is expediently arranged in a part of the circuit in which the total current of all feed cables to the phase windings can be determined.

Furthermore, at the sampling time the phase of the specified phase winding can preferably be set to a specified first electrical potential, e.g. a high potential, and the phases of the other phase windings can be set to a second electrical potential, e.g. a low potential, by means of the adapted pulse width modulation controller.

Furthermore, it is possible to control the position, i.e. the switching times, of the switch-on period and the switch-off period of the respectively energized phase winding by means of the adapted pulse width modulation controller. In particular, the pulse width modulated signals for energizing the phase windings produced by means of the pulse width modulation controller have a constant switch-on duration in total and therefore a constant voltage/time area.

The device according to the invention is used in particular for determining individual operating or measured variables, e.g. individual currents in specified phase windings of a rotating field machine, in particular a synchronous machine or an electronically commutated motor. In doing so, a computer program product is preferably used for carrying out the method.

The advantages achieved with the invention consist particularly in that, by means of an adapted pulse width modulation controller, an individual phase winding is energized at a specified sampling time. As a result of this, individual currents of the respectively energized phase winding can be measured directly with only a single current measuring device. At the same time, the effects of errors due to asymmetries in the construction and/or due to model calculations and/or estimations are reliably avoided.

A further important advantage is that the voltage/time area per pulse width modulation cycle does not change and that also no further switching edges are introduced. With a symmetrical pulse width modulation controller and synchronized sampling times, e.g., mid-point sampling, the instantaneous value of the total current consumption of the system can be measured directly by selecting the phase winding with the largest voltage/time area, i.e. the longest switch-on time. This is advantageous for fast current controllers, for example. When the current measuring device is arranged in the supply leg (also referred to as high leg) of a motor control unit with pulse width modulation control, bridge short circuits and short circuits to ground can also be reliably detected. Furthermore, by measuring the individual current by means of mid-point sampling, the individual current is effectively measured as the mean value over a whole switching period (also referred to in brief as PWM period). In doing so, the selected sampling point is preferably free from switching times so that oscillations and voltage peaks caused by switching processes are reliably avoided. Furthermore, adapting the pulse width modulation controller enables the individual currents of the phase windings to be measured cyclically by measuring the individual currents in each switching period for example. As a result of the synchronized mid-point sampling, the measured value of the individual currents is free from so-called aliasing effects. Measuring the phase with the greatest amplitude, for example by means of vector addition as described above, results in an advantageous utilization of the dynamic range of the current measuring device.

BRIEF DESCRIPTION OF THE DRAWINGS

Exemplary embodiments of the invention are explained in more detail with reference to a drawing. In the drawing.

Corresponding parts are shown with the same references in all figures.

DETAILED DESCRIPTION OF INVENTION

Figure 1:
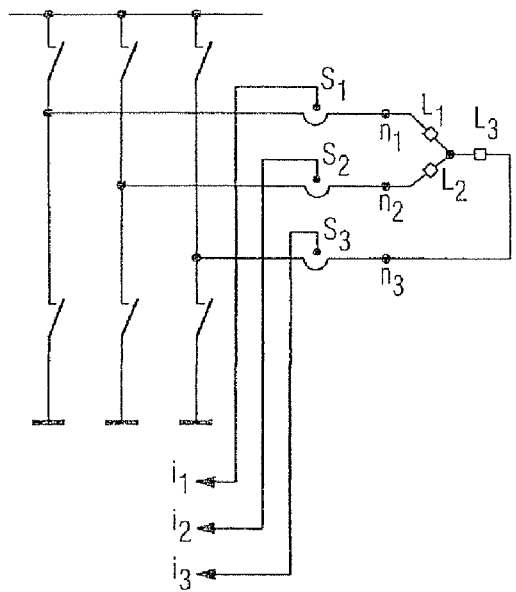
FIG. 1 shows schematically a current measuring device having a number of individual current measuring devices according to the prior art corresponding to the number of phase windings for energizing an electric motor.

As described above, FIG. 1 shows a current measuring device having a number of individual current measuring devices $S_1$ to $S_3$ corresponding to the number of phase windings $n_1$ to $n_3$ and coils $L_1$ to $L_3$ for measuring individual currents $i_1$ to $i_3$ according to the prior art. Alternatively, a number of current measuring devices $S_1$ to $S_3$ corresponding to n−1 can also be provided. In this exemplary embodiment, the missing $n^{th}$ measured variable is determined from the other two measured variables.

Figure 2:
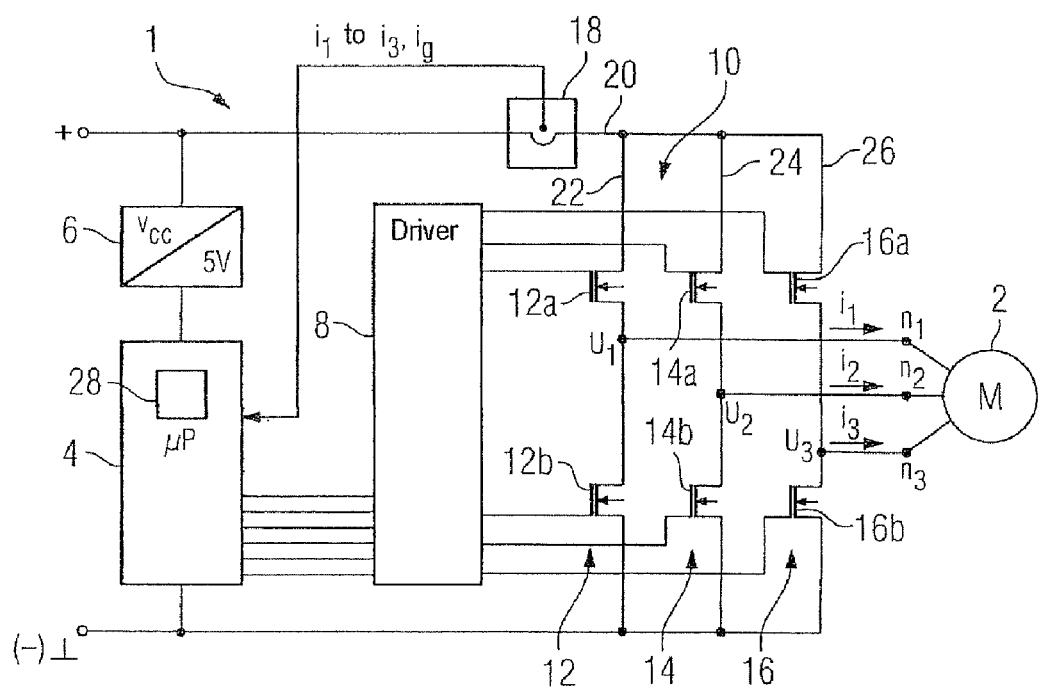
FIG. 2 shows schematically a device for controlling a rotating field machine, which can be controlled by means of pulse width modulation, in particular an electric motor having several phase windings and having a single current measuring device and a pulse width modulation controller.

A device 1 for energizing a rotating field machine 2 comprising three phase windings $n_1$ to $n_3$, e.g. of an electric motor (referred to in the following as electric motor), by means of pulse width modulation is shown in FIG. 2. A motor control unit 4, which is supplied with voltage from a power supply 6, is provided for energizing the electric motor 2. If necessary, the motor control unit 4 is connected to the phase windings $n_1$ to $n_3$ of the electric motor 2 for the purpose of energizing said motor via an amplifier 8 and a converter 10. The electric motor 2 can be any electrical drive unit, in particular an electronically commutated motor. By way of example, the motor control unit 4 is a microprocessor, a digital signal processor or some other data processing unit suitable for motor control and commutation. The amplifier 8 is a signal amplifier, for example. As shown in FIG. 2, the converter 10 comprises an associated switch 12, 14 and 16 in each phase winding $n_1$ to $n_3$. At the same time, the respective switch 12, 14 and 16 is formed from a pair of switching elements 12a, 12b and 14a, 14b and 16a, 16b. The switching elements 12a, 12b, 14a, 14b, 16a, 16b are electronic switches, in particular transistors, e.g. so-called MOS-FETs, which are connected on the output side to the phase windings $n_1$ to $n_3$ of the electric motor 2.

By means of the motor control unit 4, the phase windings $n_1$ to $n_3$ of the electric motor 2 are supplied alternately and/or with a time overlap with an associated electrical current $i_1$ to $i_3$ (referred to below as individual currents $i_1$ to $i_3$). Different operating variables of the electric motor 2 are measured and monitored depending on the requirements. In the following, the invention is described in more detail particularly with reference to the measurement of the electrical current. Alternatively or in addition, the invention can also be applied to the measurement of other operating variables, e.g. the measurement of voltage.

For an accurate instantaneous energization of the electric motor 2, these individual electrical currents $i_1$ to $i_3$ are measured as an operating variable. For this purpose, the device 1 comprises a single current measuring device 18, which is preferably arranged in a feed cable 20 to the device 1, from which the feed cables 22, 24 and 26 go to the switches 12, 14 and 16 respectively of the phase windings $n_1$ to $n_3$. The summed or total current $i_g$ of all three phase windings $n_1$ to $n_3$ can therefore be measured by means of the current measuring device 18. The feed cable 20 in particular is a supply cable and is arranged in the so-called H-leg of a bridge circuit formed by the switches 12, 14 and 16. As a result of this, bridge short circuits and short circuits to ground can also be identified by the current measuring device 18. Alternatively or in addition, another suitable measured variable, e.g. the voltage, can be measured by means of a sensor as the operating variable.

Figure 3:
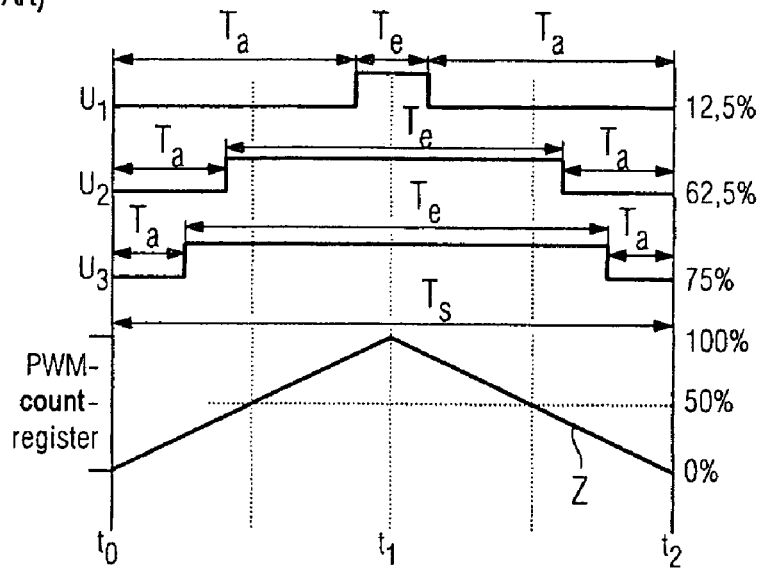
FIG. 3 shows schematically a time diagram for the energization of the motor including the switch-on and switch-off pulse sequence within a switching period for three phase windings of the electric motor according to the prior art.

The measurement of the individual currents $i_1$ to $i_3$ is necessary for the instantaneous energization of the electric motor 2. For this purpose, a pulse width modulation controller 28 is incorporated in the motor control unit 4, for example as a computer program or as an integrated circuit, which in contrast with a conventional pulse width modulation is adapted in such a way that a specified individual phase winding $n_1$, $n_2$ or $n_3$ is energized at a specified sampling time $t_1$. In doing so, an individual current $i_1$, $i_2$ or $i_3$ of the specified phase winding $n_1$, $n_2$ or $n_3$ respectively is determined by means of the current measuring device 18. FIG. 3 shows by way of example a time diagram for energizing the three phase windings $n_1$ to $n_3$ of the electric motor 2 according to the prior art with a conventional switch-on and switch-off pulse sequence with associated switch-on periods Te and switch-off periods Ta respectively within a switching period Ts for three pulse width modulated signals $U_1$ to $U_3$. Here, the time to indicates the start of the switching period Ts, the time $t_1$ the sampling time in the middle of the switching period Ts and $t_2$ the end of the switching period Ts. In addition, the behavior of a count signal Z of a pulse width modulated count register is shown for clarification. Because the pulse width modulated signals $U_1$ to $U_3$ are equally energized at time $t_1$, no current value can be measured by means of the upstream current measuring device 18. The current, which is flowing at this time, only circulates within the electric motor 2 and cannot be measured by the current measuring device 18, as at this time all three phase windings $n_1$, $n_2$ and $n_3$ are short-circuited by means of the switches 12a, 14a and 16a. Furthermore, the degree of control of the pulse width modulated signals $U_1$ to $U_3$ is shown in percent on the right-hand vertical graph. This value corresponds to the relative voltage/time area.

To measure the individual currents $i_1$ to $i_3$, the pulse width modulation controller 28 is adapted and controlled in accordance with a demand in such a way that only the individual current $i_1$ or $i_2$ or $i_3$ of the specified phase winding $n_1$ or $n_2$ or $n_3$ flows through the current measuring device 18 in a positive or negative direction at the sampling time $t_1$. This is achieved by setting the phase of the specified phase winding $n_1$, $n_2$ or $n_3$ to a first potential, e.g. high potential, and the phases of the other phase windings $n_2$, $n_3$ or $n_1$, $n_3$ or $n_1$, $n_2$ to a second potential, e.g. low potential at the sampling time $t_1$. By way of example, phase winding $n_1$ is specified in FIG. 4. At the sampling time $t_1$, only the phase of the phase winding $n_1$ is at high potential; the phases of the other phase windings $n_2$ to $n_3$ are at low potential. Therefore, only the individual current $i_1$ of the pulse width modulated signal $U_1$, which energizes the first phase winding $n_1$, decays in the current measuring device 18 at the sampling time $t_1$ and is measured directly.

A prerequisite for adapting the pulse width modulation controller 28 without this causing the drive to the electric motor 2 to change is that the voltage/time areas and therefore the switch-on periods Te of all pulse width modulated signals $U_1$ to $U_3$ remain the same over the whole switching period Ts. In order to achieve this, as shown in the comparison of the time diagrams in FIG. 3 and FIG. 4 and in FIG. 5, the degree of control of the signals $U_1$ to $U_3$ is maintained and only the switch-on and switch-off times and therefore the position of the switch-on period Te and the switch-off period Ta are displaced.

At the same time, the individual currents $i_1$ to $i_3$ to be measured can be measured at the sampling time $t_1$ of each switching period Ts and can therefore be measured cyclically. As a result of the sampling time $t_1$, which is synchronized to the middle of the switching period Ts, the measured value determined of the individual current $i_1$ to $i_3$ concerned is free from aliasing effects. In addition, the phase position of the rotor current and/or the rotor can be determined by vector addition by measuring all individual currents $i_1$ to $i_3$ of all three phase windings $n_1$ to $n_3$.

Figure 4:
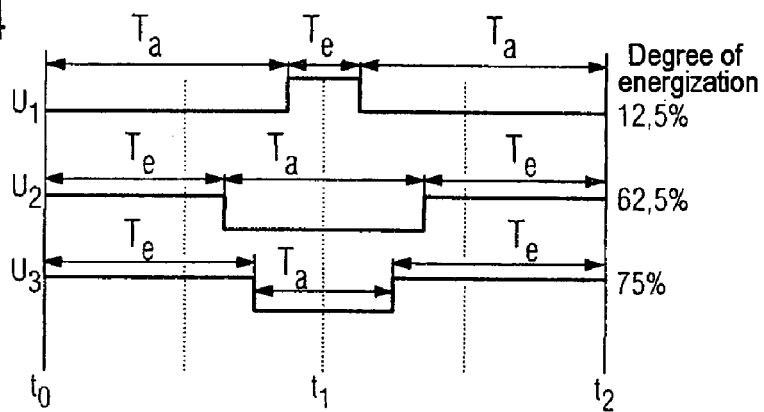
FIG. 4 to 5 shows schematically in each case a time diagram for the energization of the electric motor including the switch-on and switch-off pulse sequence within a switching period for three phase windings of the electric motor with adapted pulse width modulation controller for measuring the individual currents flowing through each phase winding.
Figure 5:
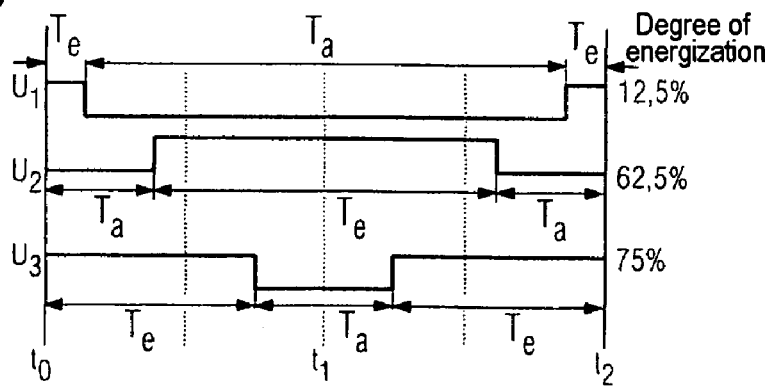

In contrast to FIG. 4, FIG. 5 shows the adapted pulse width modulation controller 28 while measuring the individual current $i_2$ in phase winding $n_2$. In this example, in a similar way to FIG. 4, only the pulse width modulated signal $U_2$ is applied at the measuring or sampling time $t_1$ so that here the associated individual current $i_2$ of the phase winding $n_2$ can be measured directly by means of the current measuring device 18 as the total current consumption.

In addition, the individual current $i_3$ of the further phase winding $n_3$ can be measured in a similar manner, which is not shown in more detail, by means of the single current measuring device 18 by changing the setting of the pulse width modulation controller 28.

The invention claimed is:

1. A method for controlling a rotating field machine, comprising:
   providing a plurality of phase windings that are controllable via pulse width modulation; and
   adapting a pulse width modulation controller such that an individual winding of the plurality of phase windings of the rotating field machine is energized at a specified sampling time,
   wherein at the specified sampling time, the phase of the energized phase winding is controlled to a specified first electrical potential and the phases of the other phase windings are controlled to a second electrical potential, and
   wherein the respective switching time of the switch-on period and the switch-off period is changed via the adapted pulse width modulation controller while the ratio of switch-on period to switch-off period of the energized phase winding remains constant.

2. The method as claimed in claim 1, wherein the basic pulse width modulation cycle is executed via the adapted pulse width modulation controller such that the ratio of switch-on period to switch-off period remains the same for each phase winding.

3. The method as claimed in claim 2, wherein pulse width modulated signals for energizing the phase windings of the motor resulting from the adapted pulse width modulation controller have a constant switch-on period in total.

4. The method as claimed in claim 3, wherein at least one pulse width modulated signal is negated and the associated pulse width modulated value is inverted.

5. The method as claimed in claim 4, wherein with an adapted symmetrical pulse width modulation controller, a pulse width modulated counter with the opposite count direction is controlled.

6. The method as claimed in claim 5, wherein the current and/or the voltage, is/are determined for the energized phase winding.

7. The method as claimed in claim 6, wherein a total current of all phase windings is determined via a single current measuring device, and, by this current measuring device, an individual current of the energized phase winding is determined by the adapted pulse width modulation controller at the specified sampling time.

8. The method as claimed in claim 7, wherein the individual current of the energized phase winding flows through the current measuring device in a positive or negative direction at the sampling time.

9. The method as claimed in claim 8, wherein the phase position of the current and/or the rotor is determined based on all the measured individual currents of all phase windings via vector addition.

10. A device for controlling a rotating field machine, comprising:
    a plurality of phase windings; and
    a pulse width modulation controller that controls the phase windings wherein an individual phase winding, is energizable at a specifiable sampling time,
    wherein at the sampling time the phase of the specified phase winding is controlled to a specified first electrical potential, and the phases of the other phase windings are controlled to a second electrical potential via the pulse width modulation controller, and
    wherein the switching time of the switch-on period and/or the switch-off period can be controlled via the pulse width modulation controller while the ratio of switch-on period to switch-off period of the energized phase winding remains constant.

11. The device as claimed in claim 10, wherein pulse width modulated signals for energizing the phase windings produced via the pulse width modulation controller have a constant switch-on period.

12. The device as claimed in claim 11, wherein, in order to measure at least one operating variable, a current measuring device is provided for determining a total current of all phase windings, and the current measuring device determines the individual current of the energized phase winding at the specified sampling time.

13. The device as claimed in claim 12, wherein the individual current of the energized phase winding can flow through the current measuring device in a positive or negative direction at the sampling time.

14. The device as claimed in claim 13, wherein the rotating field machine is a synchronous machine or a DC motor.

* * * * *